US010949066B2

(12) United States Patent
Aguilar-Gamez et al.

(10) Patent No.: US 10,949,066 B2
(45) Date of Patent: Mar. 16, 2021

(54) RECALL SERVICE FOR PRODUCTIVITY APPLICATIONS

(71) Applicant: Microsoft Technology Licensing, LLC, Redmond, WA (US)

(72) Inventors: Gama Aguilar-Gamez, Redmond, WA (US); Igor Dvorkin, Redmond, WA (US); Matthew Tebbs, Redmond, WA (US); Dhruv Sood, Redmond, WA (US); Farheen Omar, Redmond, WA (US); Jason Brinkle, Redmond, WA (US); Julia Syi, Redmond, WA (US); Mark Schmidt, Redmond, WA (US); RajaniKanth Ageeru, Redmond, WA (US); Robert Hanley, Redmond, WA (US); Taft Sandbakken, Redmond, WA (US); Vihar Tammana, Redmond, WA (US); Emanuel Rosu, Redmond, WA (US); Piotr Walaszek, Redmond, WA (US); Robert Rounthwaite, Redmond, WA (US); Evyenia R. KaraEftimoglu, Redmond, WA (US); James Mellers, Redmond, WA (US); Andrew Shuman, Redmond, WA (US); Agnieszka Girling, Redmond, WA (US); Sreekanth Kannepalli, Redmond, WA (US); Ian Williams, Redmond, WA (US); Nishadi Kolonne, Redmond, WA (US); Bonnie Pan, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 130 days.

(21) Appl. No.: 15/421,302

(22) Filed: Jan. 31, 2017

(65) Prior Publication Data
US 2017/0220359 A1 Aug. 3, 2017

Related U.S. Application Data

(60) Provisional application No. 62/289,757, filed on Feb. 1, 2016.

(51) Int. Cl.
*G06F 3/0484* (2013.01)
*G06F 9/451* (2018.01)
(Continued)

(52) U.S. Cl.
CPC .......... *G06F 3/0484* (2013.01); *G06F 3/0482* (2013.01); *G06F 9/451* (2018.02); *G06F 16/10* (2019.01)

(58) Field of Classification Search
CPC ...... G06F 9/4443; G06F 3/0484; G06F 9/451; G06F 3/0482
See application file for complete search history.

(56) References Cited

U.S. PATENT DOCUMENTS 7,523,191 B1 4/2009 Thomas et al.
7,673,340 B1 3/2010 Cohen et al.
(Continued)

OTHER PUBLICATIONS

Koster, Michael, "Data models for the Internet of Things", Published on: Oct. 30, 2015 Available at: http://iot-datamodels.blogspot.in/.

(Continued)

*Primary Examiner* — Sherrod L Keaton

(57) ABSTRACT

Non-limiting examples of the present disclosure describe surfacing a representation of digital artifacts for a user. An operation context associated with a user is identified. The operational context may correspond with an electronic document that is accessed through a productivity application. One or more of a plurality of digital artifacts may be identified based on the identified operational context. An exemplary representation of the one or more digital artifacts (Continued)

is surfaced through a user interface. An exemplary user interface may be a user interface of a productivity application, for example, where the electronic document is being accessed through the productivity application. In alternative examples, an exemplary user interface may be associated with a home service that is executed in association with an operating system (OS). In some instances, an operational context may change resulting in an update to an exemplary representation of digital artifacts. Other examples are also described.

20 Claims, 15 Drawing Sheets

(51) Int. Cl.
*G06F 16/10* (2019.01)
*G06F 3/0482* (2013.01)

(56) References Cited

U.S. PATENT DOCUMENTS

| | | |
|---|---|---|
| 7,970,870 B2 | 6/2011 | Hinckley et al. |
| 2002/0151992 A1 | 10/2002 | Hoffberg et al. |
| 2003/0156138 A1 | 8/2003 | Vronay et al. |
| 2006/0184566 A1 | 8/2006 | Lo et al. |
| 2007/0271521 A1 | 11/2007 | Harriger et al. |
| 2007/0277196 A1 | 11/2007 | Steengaard et al. |
| 2009/0030872 A1* | 1/2009 | Brezina ............... H04M 15/00 |
| 2010/0180200 A1* | 7/2010 | Donneau-Golencer ................... G06Q 10/10 715/705 |
| 2011/0035692 A1 | 2/2011 | Sandone et al. |
| 2011/0066619 A1 | 3/2011 | Perantatos et al. |
| 2011/0231773 A1* | 9/2011 | Dhara ................... H04L 47/70 715/738 |
| 2012/0131321 A1 | 5/2012 | Jitkoff et al. |
| 2012/0221712 A1 | 8/2012 | Sullivan et al. |
| 2013/0332830 A1 | 12/2013 | Ciurdar et al. |
| 2015/0019624 A1* | 1/2015 | Jayakeerthy ............ H04L 67/02 709/203 |
| 2015/0143246 A1 | 5/2015 | Wang et al. |

OTHER PUBLICATIONS

Weld, et al., "Automatically Personalizing User Interfaces", In Proceedings of the Eighteenth International Joint Conference on Artificial Intelligence, Aug. 9, 2003, 7 pages.

"Twinsplay-Free Download and Software Reviews—CNET Download", Retrieved from <<http://download.cnet.com/Twinsplay/3000-2383_4-10915608.html>>, Jun. 29, 2011, 4 Pages.

"Twinsplay Tutorial—Productivity-Oriented Window and Session Manager", Retrieved from <<https://www.youtube.com/watch?v=0JmKJADZ1xY>>, Jun. 29, 2011, 1 Page.

"International Search Report and Written Opinion Issued in PCT Application No. PCT/US2017/15900", dated Jun. 14, 2017, 11 Pages.

ZINSTALL, "Learn More-Zinstall Transfer Programs and Files to New PC, to Windows 10, 8, 7", Retrieved from <<http://www.twinsplay.com/learn-more-about-twinsplay>>, Jun. 6, 2017, 2 Pages.

Zinstall, "Twinsplay", Retrieved from <<http://www.twinsplay.com>>, Sep. 4, 2009, 2 Pages.

* cited by examiner

100

200

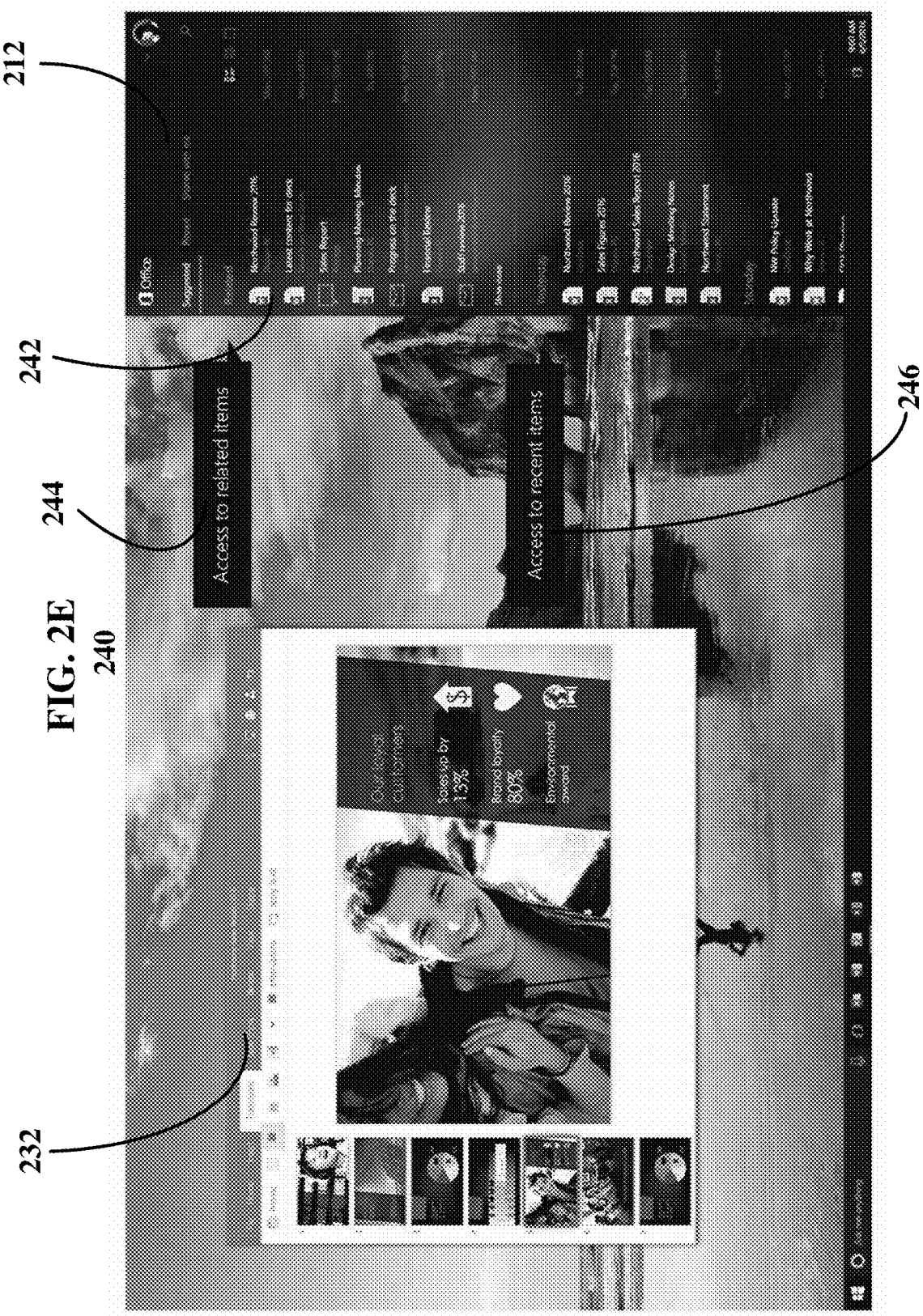

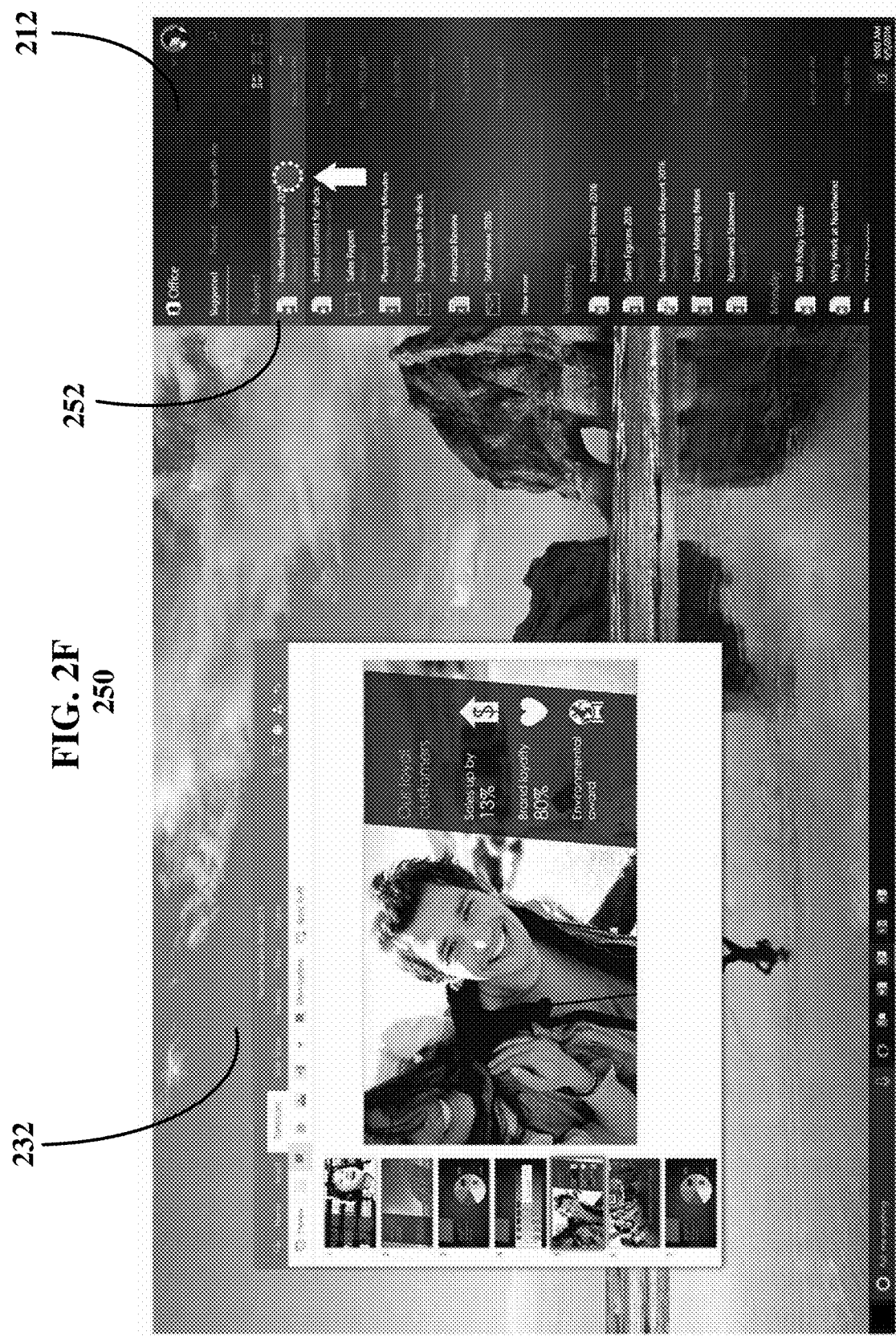

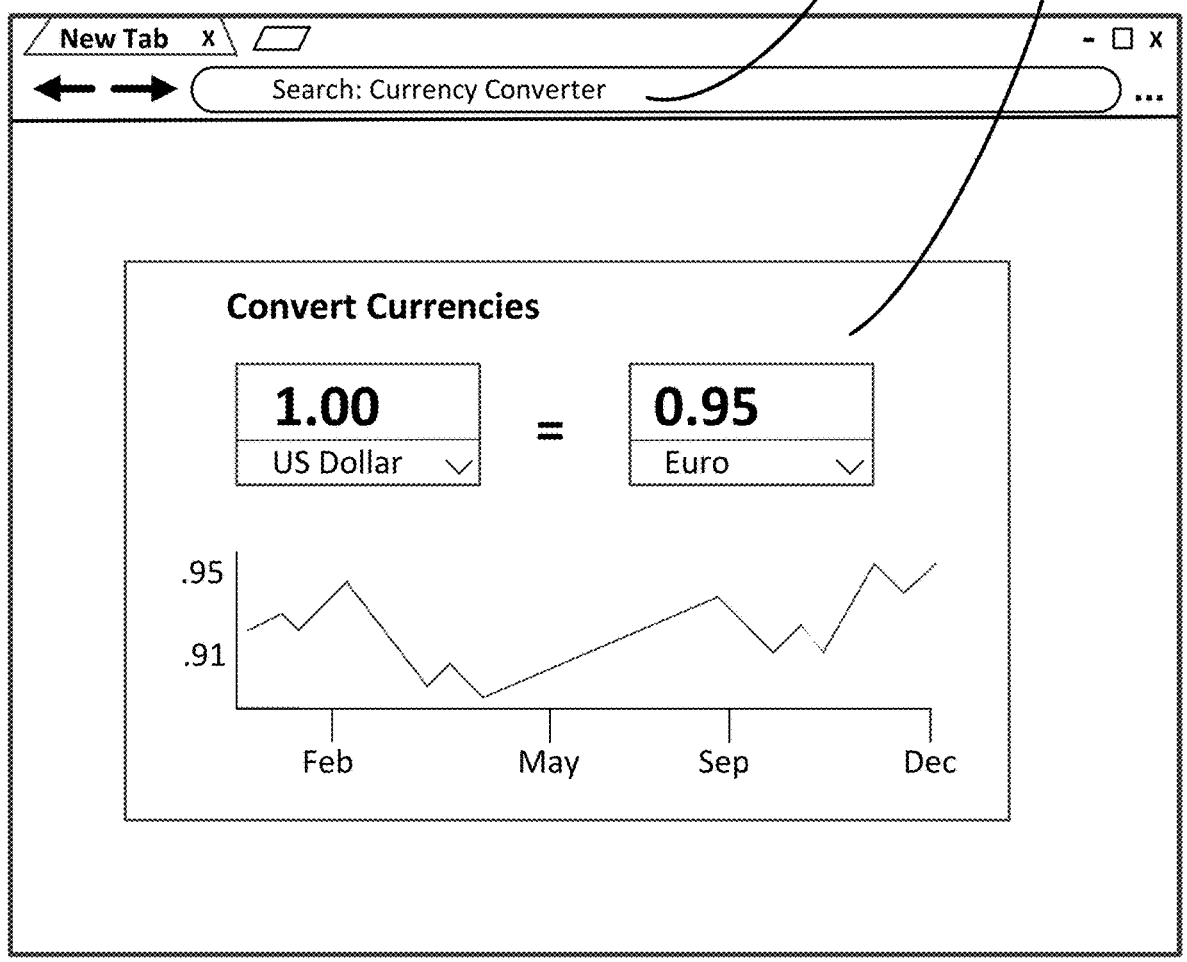

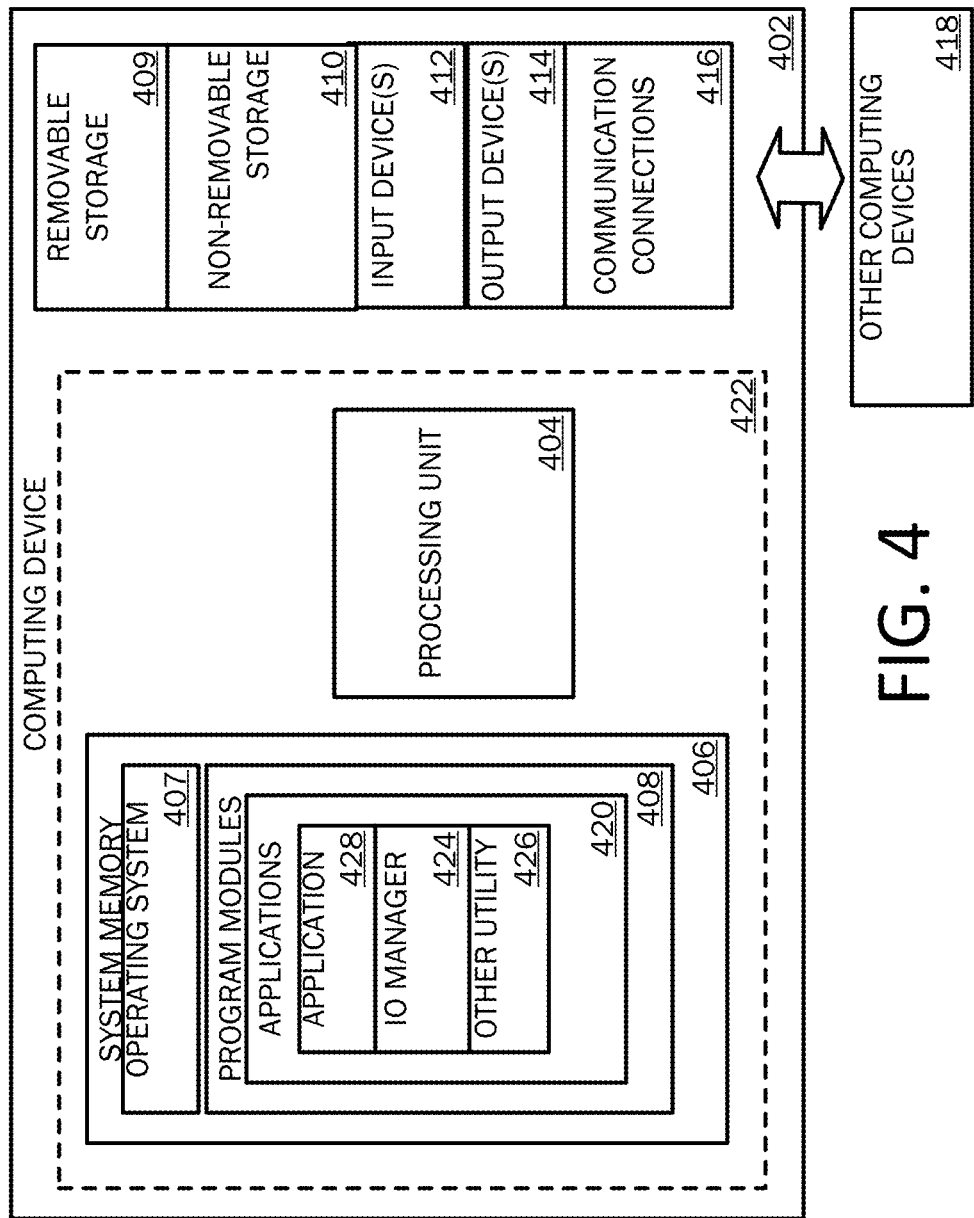

RECALL SERVICE FOR PRODUCTIVITY APPLICATIONS

CROSS REFERENCE TO RELATED APPLICATION(S)

This application is a Non-Provisional Patent Application of, and claims priority to, U.S. Provisional Patent Application No. 62/289,757, filed Feb. 1, 2016, entitled "HOME SERVICE FOR PRODUCTIVITY APPLICATIONS" which is incorporated herein by reference in its entirety.

BACKGROUND

When end-users interact with productivity applications they typically interact with several different types of content that may be provided through different applications or services. For example, a user may email other people while working on a document, consult a webpage, and/or work with other digital content. Re-creation of a previous context can be difficult and time consuming for a user. Typically, the user performs ad-hoc memory recall while attempting to re-create a previous context. In doing so, the user has too try and remember things such as: where it last left off, types of applications/services previously accessed at the time a productivity application was being used, context in which the types of content were being used and task items that need to be completed. From a more technical perspective, ad-hoc methods as described above can waste computing resources, such as processing cycles and battery power, while a user searches for the right digital content to recreate a previous context.

As such, examples of the present application are directed to the general technical environment related to automatically surfacing of digital artifacts based on an operational context associated with a user.

SUMMARY

Non-limiting examples of the present disclosure describe surfacing a representation of digital artifacts for a user. An operation context associated with a user is identified. In one example, the operational context corresponds with an electronic document that is accessed through a productivity application. A plurality of digital artifacts may be identified based on the identified operational context. An exemplary representation of the digital artifacts is surfaced through a user interface. An exemplary user interface may be a user interface of a productivity application, for example, where the electronic document is being accessed through the productivity application. In alternative examples, an exemplary user interface may be associated with a recall service that is executed in association with an operating system (OS), among other exemplary instances. In some instances, an operational context may change resulting in an update to an exemplary representation of digital artifacts. Update to an exemplary representation may comprise re-generation of a representation of digital artifacts. Re-generation of a representation may comprise replacing one or more of the plurality of digital artifacts with the one or more digital artifacts associated with the updated operation context.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 2A-2G provide user interface views illustrating user interface with which aspects of the present disclosure may be practiced.

FIGS. 3A-3C provide user interface views illustrating an example of linking digital content to an exemplary electronic document with which aspects of the present disclosure may be practiced.

FIG. 4 is a block diagram illustrating an example of a computing device with which aspects of the present disclosure may be practiced.

DETAILED DESCRIPTION

Figure 1:
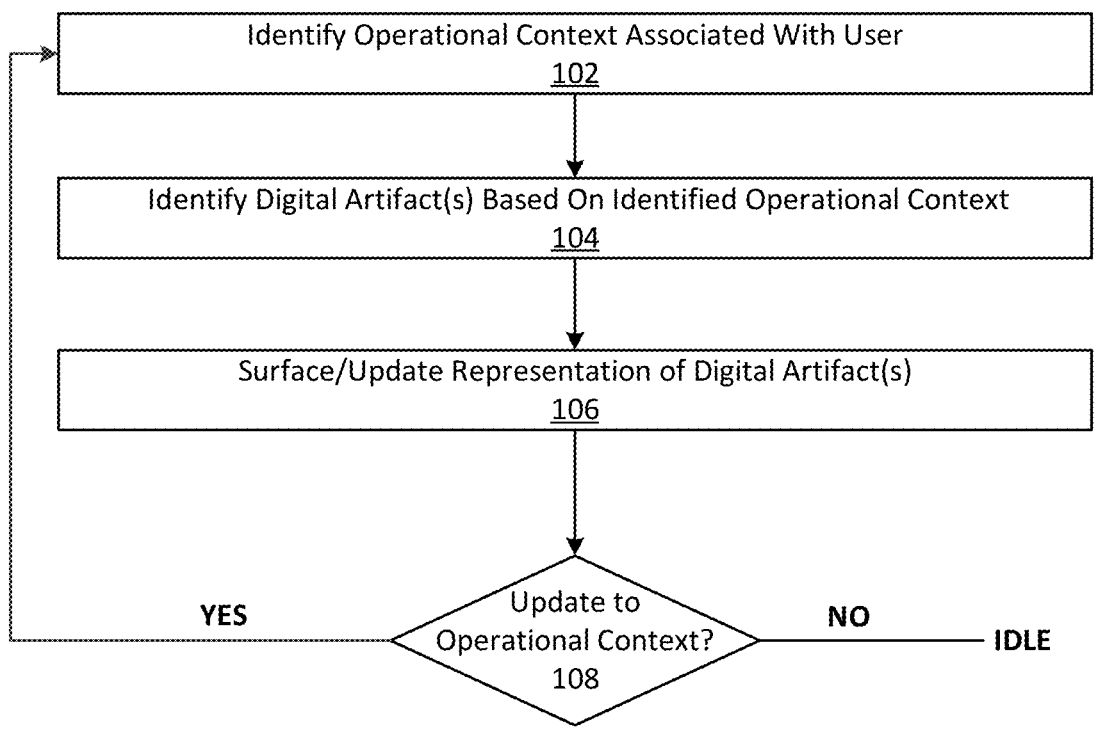
FIG. 1 is an exemplary method related to surfacing of a representation of digital artifacts for a user with which aspects of the present disclosure may be practiced.

Non-limiting examples of the present disclosure describe surfacing a representation of digital artifacts for a user. In doing so, a recall service, as contemplated herein, improves the content creating, editing, and consumption experience. In some implementations, the recall service runs in the background with respect to various software applications, such as a word processor, a spreadsheet program, a visual presentation program, and an email client, among other examples. The recall service monitors what a user is doing as he or she interacts with content, including tracking various operational states as they are encountered as well as associating the operational states with specific digital artifacts. The next time the user returns to a given state (e.g. operational context), the digital artifacts associated with that state can be identified and surfaced in a user interface.

As an example, a user may open a word processing document. While the user is interacting with the document (e.g. editing, reading, and/or sharing it), he or she may interact with various other pieces of digital content in the context of working on the document. In that example, working on the document is identified as an operational context of the user and the pieces of digital content encountered while working on the document are digital artifacts that are associated with that context. The next time the user returns to the document, one or more of the digital artifacts can be represented in a user interface for the user to quickly access and resume working on the document.

The recall service helps users get back to what they were doing by surfacing items related to the content that the user currently working with. A contextual object model (e.g. unified object data model) of the recall service is configured to group and relate arbitrary types of digital content such as emails, files, pictures, tasks, web pages, documents, etc. The contextual object model contains metadata about the type of content, the context in which the content was captured (such as: the process/application, source of a copy, where the content was pasted, timestamp, window position). The recall service automatically creates logical groupings of these arbitrary items and surfaces these items to users in the context of what the user is currently doing.

To properly recreate a context, users typically require several digital artifacts for their work (such as web pages, documents, presentations, emails, tasks, conversations). These artifacts are stored in different ways in many different tools such as application/services. Getting to (or getting back to) a set of artifacts they need requires time & effort. Users spend time and effort getting back to something they were working on earlier. Commonly, users may have trouble re-locating digital content. Users often find it tedious to re-create their work sessions and spend time and energy re-opening the applications and documents they previously opened.

The recall service contemplated herein is configured to observe and learn the context and behavior of a user to create associations between electronic documents, the context in which an electronic document is accessed, and user preferences. When a certain threshold of confidence is reached, the recall service creates suggestions of what the user may most likely desire to access based on these leanings and associations. The recall service may highlight certain digital artifacts over other digital artifacts based on an evaluation of the operational context of the user. For instance, some digital artifacts may have been open at a time an electronic document was previously being used but those same digital artifacts may not be relevant to a context in which the electronic document was being used. In at least one example, the operational context of the user is associated with an electronic document, where a contextual object model is used to evaluate previous contexts associated with the electronic document. Such an analysis may identify that certain digital artifacts are more relevant than other digital artifacts when it comes to an operational context of the user (e.g. accessing a specific electronic document).

An exemplary recall service is configured to apply a contextual object model (e.g. unified object data model) that enables the recall service to group and relate arbitrary types of digital content such as emails, files, pictures, tasks, web pages, documents, etc. The contextual object model contains metadata about the type of content as well as context in which the content was captured (such as: the process/application, source of a copy, where the content was pasted, timestamp, window position). The contextual object model evaluates such features to provide suggestions that may be most relevant to a user, for example, based on a current operational context of the user.

Rather than being finite containers which are manually created, digital artifacts are virtual and automatically created. Previous contexts of the user and/or associated digital artifacts may be suggested by the recall service based on known associations between the digital artifacts and the user's current context. The contextual object model may log data and adaptively learn about the user over time through interactions with an application/service or collection of applications/services (e.g. suite of applications of a platform). There is no need for the user to create and manage associations, remembering to add and remove things from a working set, etc. While users can explicitly modify associations, associations are automatically created and known without any input from the user.

As referenced above, some digital artifacts may be more relevant than others to a specific context and thus are given a higher ranking in a list of system-determined relevant things. A system-determined list is dynamic and constantly changing as it has a direct relationship with the user's behavior. Over time, a digital artifact that the user deems very important may lose its importance as other artifacts take its place and the service will re-organize the list to reflect this change. Not everything placed into a set will always be relevant to the user at any given moment.

In further examples, context associated with an exemplary electronic document may be saved. For instance, a type of digital content may be associated with an electronic document. In one instance, an application/service is associated with an electronic document such as a word document, spreadsheet document, visual presentation document, etc. For instance, digital content may be pinned to the electronic document, which creates a link between the digital content and the electronic document. When the electronic document is subsequently accessed, the pinned digital content may be identified for a user. In one instance, a created link (e.g. from pinned content) may also be associated with previous context in which the digital content was being utilized. In one example, a placement/position of the pinned digital content may be saved so that context can be provided for the user who is accessing the electronic document. For instance, if a user were to position windows (associated with different applications/services) in a certain order, a digital artifact may be maintained that can recreate the context of the window positioning, which may be useful to a user who is multi-tasking when using multiple applications/services. In a further example, executed actions that correspond with pinned digital content may be recalled for a user. For instance, a user may access a visual slide-based presentation where pinned digital content (e.g. from other types of applications/services) may be associated for the user when the visual slide-based presentation is accessed at a later point in time.

Accordingly, the present disclosure provides a plurality of technical advantages including but not limited to: generation and application of an exemplary contextual evaluation model, automatic generation of exemplary representations of digital artifacts, processing efficiency (e.g., saving computing cycles/computing resources) to quickly and efficiently provide digital artifacts that are associated with an operational context associated with a user, improving user interaction with productivity applications and platform computing resources, and extensibility to integrate processing operations described herein in a variety of different applications/services, among other examples.

FIG. 1 is an exemplary method 100 related to surfacing of a representation of digital artifacts for a user with which aspects of the present disclosure may be practiced. As an example, method 100 may be executed by an exemplary processing device and/or system such as those shown in FIGS. 4-6. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. Processing operations described in method 100 may be implemented by one or more components connected over a distributed network.

Method 100 begins at processing operation 102, where an operational context for a user is identified. An operational context is a processing state of a computing device when a user is interacting with the computing device. Examples of computing devices are provided in at least the description of FIGS. 4-6. An exemplary recall service is configured to interact with a computing devices and executing applications/services to detect and identify an exemplary operational context associated with a user. In doing so, the recall service is configured to execute processing operations that run in the background with respect to various software applications, such as a word processor, a spreadsheet program, a visual presentation program, and an email client, among other examples. The recall service is configured to identify a current operational context of the user, where the operational context may change based on the types of applications/services that the user is interacting with. For instance, the recall service is configured to detect what a user is doing as he or she interacts with digital content, including tracking various operational states as they are encountered and associating the operational states with specific digital artifacts.

A digital artifact, as described herein, is a representation of a state of use with respect to specific digital content. The digital artifact may identify a type of application/service that was executed at a given point in time as well as context in which the application/service was being used. For instance, a digital artifact may be a specific instance (or instances) of access to a certain type of digital content. It is to be understood that the recall service is configured to extend to examples where access to an electronic document is associated with a service (and not strictly tied to a specific computing device). An exemplary contextual object model of a recall service can be configured to analyze instances where electronic documents are accessed at a specific computing device as well as instances where electronic documents are accessed through a service. In some examples, a service may be a platform service that is associated with a suite of productivity applications, where usage data from the suite of productivity applications is analyzed to improve the relevancy of digital artifact suggestions.

A digital artifact may comprise metadata indicating, among other examples, a type of digital content, application/services used to access the digital content, actions executed within a specific application/service and correspondence with other applications/services (e.g. copy/paste operations, pinned content, bookmarked content, etc.). Metadata may be associated with an exemplary digital artifact that can be utilized by the recall service to identify: 1) a subset of digital artifacts (one or more digital artifacts) that were executing in association with an electronic document and 2) a context in which the digital artifacts were being executed. The metadata associated with the digital artifacts can be further evaluated to select and order a subset of digital artifacts that may be most relevant to a user based on the identified operational context. The next time the user accesses certain productivity applications, a previous operational context can be automatically suggested (and/or recreated) for the user where digital artifacts can be identified and surfaced in a user interface associated with the recall service.

In some instances, the recall service may be a user interface menu that is presented through an operating system (OS) running on a computing device. In other instances, the recall service may be integrated within a productivity application that is being accessed by a user. Processing operations executed by the recall service may include operations to collect and evaluate data that identifies user interaction with a computing device (e.g. operational context), where collected data may include but not limited to: identification of applications/services are executing on the computing device, identification of an application/service that is executing in a foreground of an operating system (OS) and/or a background of the OS that is executing on a computing device, types of digital content being accessed, who the user is communicating with (e.g. through an application/service), cross-reference to other applications/services (e.g. scheduled meetings, calendared events, reminders, task lists, social networking services, emails, messages, etc.), access to user profile information (e.g. user profile for a distributed service account) trending news/feeds or other related digital content, among other examples.

In one example, the operational context corresponds with an electronic document that is accessed through a productivity application. However, the present disclosure is not so limited and can also extend to examples where notifications and/or message content are provided to a user through the recall service or any other type of application/service. An electronic document is a record of content presented in an electronic format. As some examples, an electronic document may comprise but is not limited to: files, message threads, webpages and media objects, among other examples.

An exemplary user interface may be a user interface of a recall service that is executing in association with an OS. In another example, an exemplary user interface may correspond to a user interface of a productivity application. A productivity application is any application/service that is utilized to provide and management an exemplary electronic document. Productivity applications may include but are not limited to: web search services, e-mail applications, calendaring applications, word processing applications, spreadsheet applications, notes applications, visual presentation applications and database management applications, among other examples. As identified above, a productivity application may be an application that is included in a platform suite of applications.

Once an operational context is identified, flow may proceed to processing operation 104, where one or more digital artifacts is identified based on the operational context associated with a user. Processing operation 104 may comprise identifying a plurality of digital artifacts based on the identified operational context. The plurality of digital artifacts is a subset of digital content that was executing on processing device (or processing devices through a service) at one or more times in which the electronic document was previously accessed. For instance, the plurality of digital artifacts may identify some (but not all) of the content that was being accessed in association with an electronic document.

As an example, the plurality of digital artifacts may be identified based on application of a contextual object model. An exemplary contextual object model may be configured to evaluate an identified operational context of the user in view of previous context that is associated with an exemplary electronic document. The contextual object model (e.g. unified object data model) may be applied by an exemplary recall service as described herein to identify specific digital artifacts and generate an exemplary representation of the digital artifacts for the user.

To identify (processing operation 104) a plurality of digital artifacts that may be relevant to an operational context associated with a user, the contextual object model is configured to group and relate arbitrary types of digital content such as emails, files, pictures, tasks, web pages, documents, etc. In doing so, the contextual object model parses and evaluates metadata pertaining to digital content of the digital artifact including metadata relate to: identification of type of digital content, the context in which the digital content was captured (e.g. the process/application, source of a copy, where the content was pasted, timestamp), executed actions associated with an application/service, created links and/or associations and window position, among other examples. The recall service utilizes inferences to automatically create logical groupings of these arbitrary items and evaluate and rank the digital artifacts for relevance to an operational context associated with a user. As an example, application of the contextual object model may comprise executing processing operations to evaluate context in which an exemplary electronic document was previously accessed. For instance, a user may be creating a slide-based visual presentation in a visual presentation program (e.g. productivity application) and access a web browser application to obtain data to include within the slide-based visual presentation. Metadata may be collected and analyzed that can identify a context in which the web browser application was accessed in association with an exemplary file of the visual presentation program.

In evaluating context/contexts in which the electronic document was previously accessed, the contextual object model is configured to evaluate metadata associated with a digital artifact (e.g. access to one or more types of digital content), for example, where specific digital content was previously accessed in parallel with the electronic document. The contextual object model, in evaluating the context in which the one or more types of digital content were previously accessed, evaluates one or more selected from a group consisting of: timestamp data as to when the digital content was accessed, executed actions through an application/service (e.g. in during a time in which the electronic document was simultaneously accessed), whether content was copied/pasted from an application/service to an electronic document, links and associations created between the electronic document and specific digital content (e.g. of an application/service) and window position of the application/service (e.g. relative to that of the electronic document), among other examples. For instance, if a user were to position windows (associated with different applications/services) in a certain order, a digital artifact may be maintained that can recreate the context of the window positioning, which may be useful to a user who is multi-tasking when using multiple applications/services.

The contextual object model may select, for analysis, any number of features based on the metadata associated with a digital artifact and evaluate the context in which the digital content is relevant to the electronic document. Feature selection may vary based on the data that the contextual object model is working with. Feature selection and optimization may be configured by developers of an exemplary recall service. Processing related to feature selection and optimization is known to one skilled in the art. In at least one example, the contextual object model is a learning model that may be adaptive and update based on learned behaviors of users. That is, inputs as well as other aspects such as feature selection and optimization may change over time based on learning by the contextual object model. Examples of data that can be used to adapt the contextual object model includes but is not limited to: training data, telemetry data, user actions including user choices and disambiguation, new associations of the user, and access to new applications/services, among other examples. Training of an exemplary contextual object model may occur offline or in real-time.

An exemplary output of the contextual object model may be one or more confidence scores associated with specific digital artifacts. An exemplary confidence score indicates how confident a system is that a digital artifact for the digital content should be recommended to a user. In one example, the contextual object model may apply a ranker to generate a confidence score for relevance of a digital artifact in relation to an electronic document. In some examples, an output is one or more digital artifacts that meet a certain threshold of confidence. Threshold levels and confidence scoring of the contextual object model may be set by developers and can vary in different applications. Confidence score evaluation can assist the contextual object model in generating an exemplary representation of one or more digital artifacts to surface for a user. In other examples, digital artifacts may be logically grouped based on evaluation of the metadata and/or confidence scoring. For instance, an output may be one or more created groupings of digital artifacts (e.g. a listing of digital artifacts). Different groupings of digital artifacts may be surfaced based on the identified operational context that is associated with the user. For instance, if a user switches access to another electronic document, a new grouping of digital artifacts may be surfaced for the user.

In further examples for determining which digital artifacts to suggest, the exemplary contextual object model may evaluate utilization of digital artifacts by more than one user. In one instance, an electronic document may be collaboratively accessed by a group of users. In another instance, an electronic document may be shared with another user. Telemetry data may be collected and evaluated regarding access to electronic documents and associated digital artifacts, where the telemetry data is collected for a plurality of users. In any example, the contextual object model may be configured to identify, among other features: which users accessed an electronic document, digital artifacts that were simultaneously accessed along with the electronic document as well as a context in which the digital artifacts were accessed by a specific user. In one example, priority for listing digital artifact suggestions is based on an evaluation of access to the electronic document by one or more other users (e.g. the choice of items to include in a listing depends on other's interactions with those documents, either in the interim or before, including collaboration signals).

In an alternative example, processing executed by an exemplary contextual object model is based on learning patterns at scale that are obtained from evaluating data associated with other users. In this way, the contextual object model is also configured to provide predictive analysis where a listing of digital artifacts may comprise suggestions that are based on the operation of other users (e.g. in a similar operational context). For example, telemetry data may be collected and analyzed for users of a specific application/service. In further examples, telemetry data may be collected and analyzed for users across a plurality of application/services (e.g. suite of productivity applications) that are accessed by a plurality of users. That is, contextual analysis, executed by an exemplary contextual object model, may correlate an operation context of a user with an operational context of one or more other users for providing suggestions of digital artifacts. The contextual object model may be configured to evaluate similarities between an operational context of a user and previous operational contexts of other users to generate suggestions for digital artifacts that may be most relevant to a user based on an identified operational context. For instance, users of another application may have been performing a similar task and may have accessed resources that may be useful to a current operational context of a user. Having access to a plurality of different applications (e.g. cross-referencing other productivity applications) enables the contextual object model to improve accuracy and relevancy in its recommendations of digital artifacts, thus greatly enhancing a user experience/ interaction with applications/services and computing devices.

Flow of method 100 may proceed to operation 106, where an exemplary representation of one or more digital artifacts is surfaced through a computing device. An exemplary representation of digital artifacts may be a predictive result that aims to provide relevant digital artifact suggestions based on the processing executed by the contextual object model. The representation is a visual presentation of digital artifacts providing identification of previously accessed content that is ordered based on contextual analysis of the digital artifacts from processing of the contextual object model. Examples related to display of exemplary representations of digital artifacts are provided in at least FIGS. 2A-2G.

As an example, processing operation 106 may comprise generating an exemplary representation of one or more digital artifacts for the user. As identified above, one or more groupings of digital artifacts can be generated based on application of the contextual object model. Exemplary representations can be generated based on the logical groupings created by the contextual object model. Display of one or more groupings or digital artifacts from specific groups can be surfaced to the user through an exemplary user interface of the recall service, OS and/or a productivity application.

An exemplary representation of digital artifacts may comprise selectable user interface features that can provide links/associations to specific digital content/electronic documents. For example, a listing of most relevant digital artifacts for an operational context associated with the user may be surfaced through a computing device. An exemplary listing of most relevant digital artifacts is differentiated from other listings such as recently accessed electronic documents as the latter does not account for contextual relationships between electronic documents. An exemplary representation may further comprise user interface features for notifications, callouts, rich media objects, etc. Priority for a listing of digital artifacts may vary based on developer specifications and/or data sets that are available to the contextual object model. As an example, representation of digital artifacts may prioritize digital artifacts that were associated with a previously detected operational context of a user. In further examples, an exemplary representation of digital artifacts may also include suggestions of other digital artifacts (e.g. accessed by other users of an application or suite of applications) that may be relevant to a current operational context of a user.

Once an exemplary representation of digital artifacts is surfaced, flow may proceed to decision operation 108, where it is determined whether an update to an operational context has occurred. An exemplary recall service may be configured to detect changes to an operational context of the user. If no update occurs to the operational context, flow branches NO and processing of method 100 remains idle until subsequent processing is to be executed. If it is detected that an operational context has changed, flow branches YES and returns to processing operation 102, where an updated operational context is identified. An operational context may change resulting in an update to an exemplary representation of digital artifacts. Update to an exemplary representation may comprise re-generation or update of a representation of digital artifacts. In at least one example, re-generation of a representation may comprise replacing one or more of the plurality of digital artifacts with the one or more digital artifacts associated with the updated operation context.

FIGS. 2A-2G provide user interface views 200-260 illustrating user interface with which aspects of the present disclosure may be practiced. Processing operations associated with generation of exemplary user interface views 200-260 may occur based on processing operations executed in method 100 (described in the description of FIG. 1) in association with communication with one or more exemplary productivity applications. An exemplary productivity application, as illustrated in user interface views 200-260, is a visual presentation program/service. However, an exemplary productivity application is not limited to such an example.

User interface view 200 (of FIG. 2A) provides a view of an OS of a computing device. The exemplary computing device is executing a recall service program as illustrated by user interface feature 202. An exemplary recall service has been described in the foregoing including the description of method 100 (FIG. 1). In at least one example, the recall service may be a distributed service that a user can utilize to gain access to a plurality of different application/services. As an example, user interface feature 202 is a selectable user interface feature where selection of user interface feature 202 triggers display of a recall service menu as shown in user interface view 210 (FIG. 2B).

User interface view 210 (of FIG. 2B) provides a view of an OS of a computing device that comprises the recall service menu 212. The recall service menu 212 is a collection of user interface features that are organized for the user. As shown in user interface view 210, the recall service menu 212 provides a listing of suggested content for the user. The recall service menu 212 may comprise logical groupings of content for the user (e.g. suggested content, pinned/bookmarked content, shared content, etc.). Content types provided through the recall service menu 212 may vary and include content from a plurality of different productivity applications. Furthermore, the logical groupings of content may be further grouped in different ways for user convenience (e.g. most recently accessed items, suggested digital artifacts, saved content, etc.).

Figure 2A:
Figure 2B:
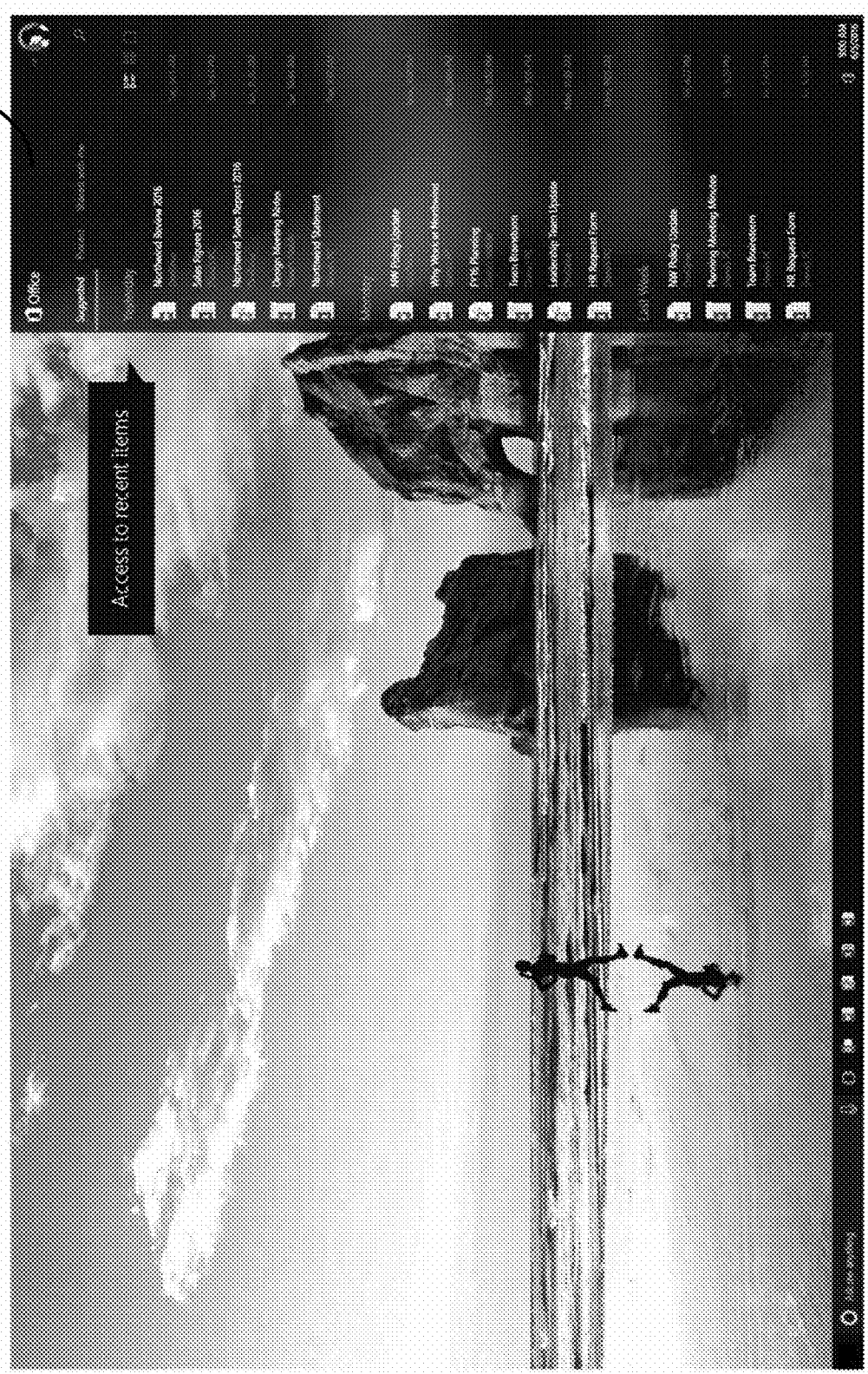
Figure 2C:
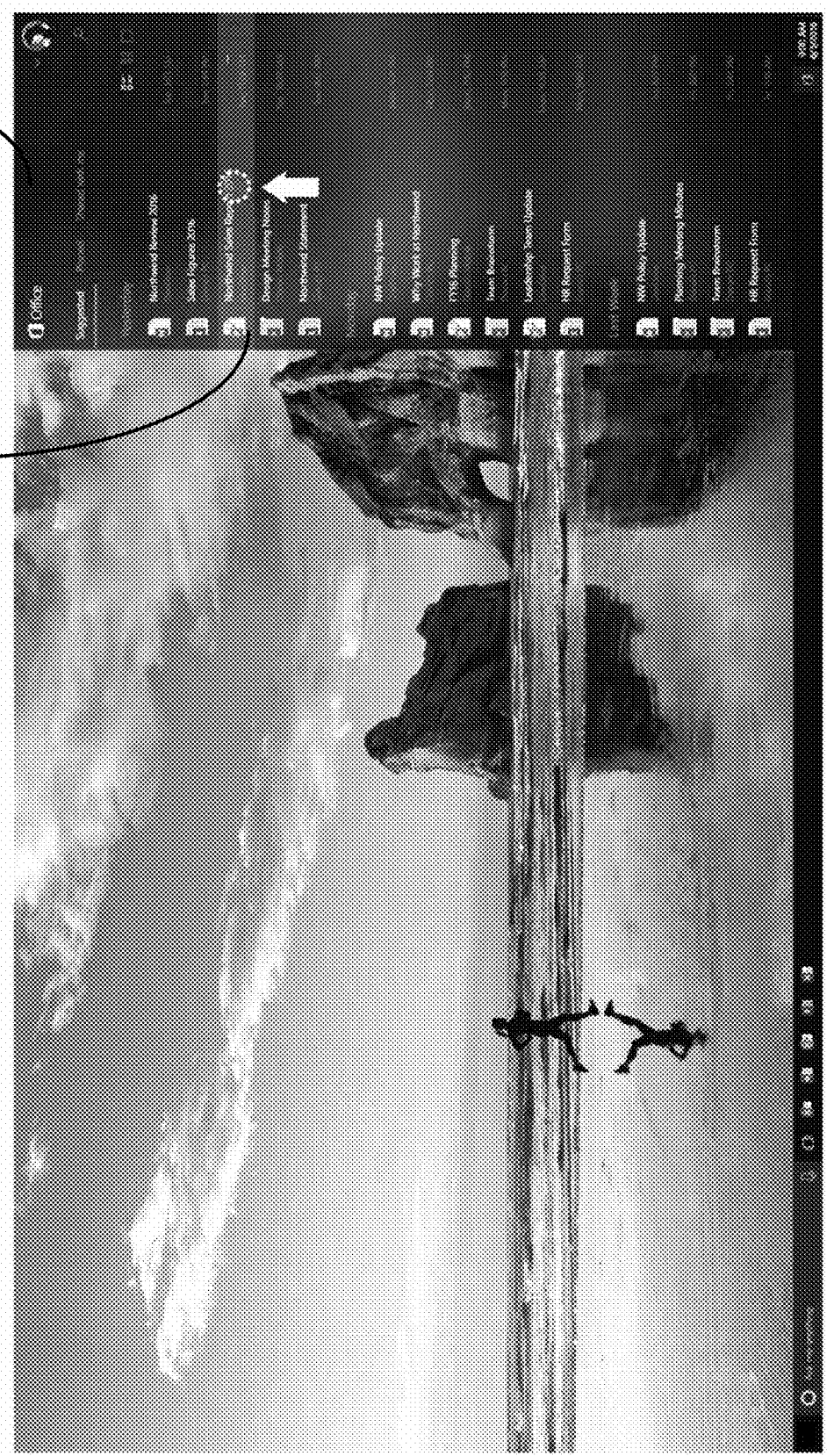
Figure 2D:
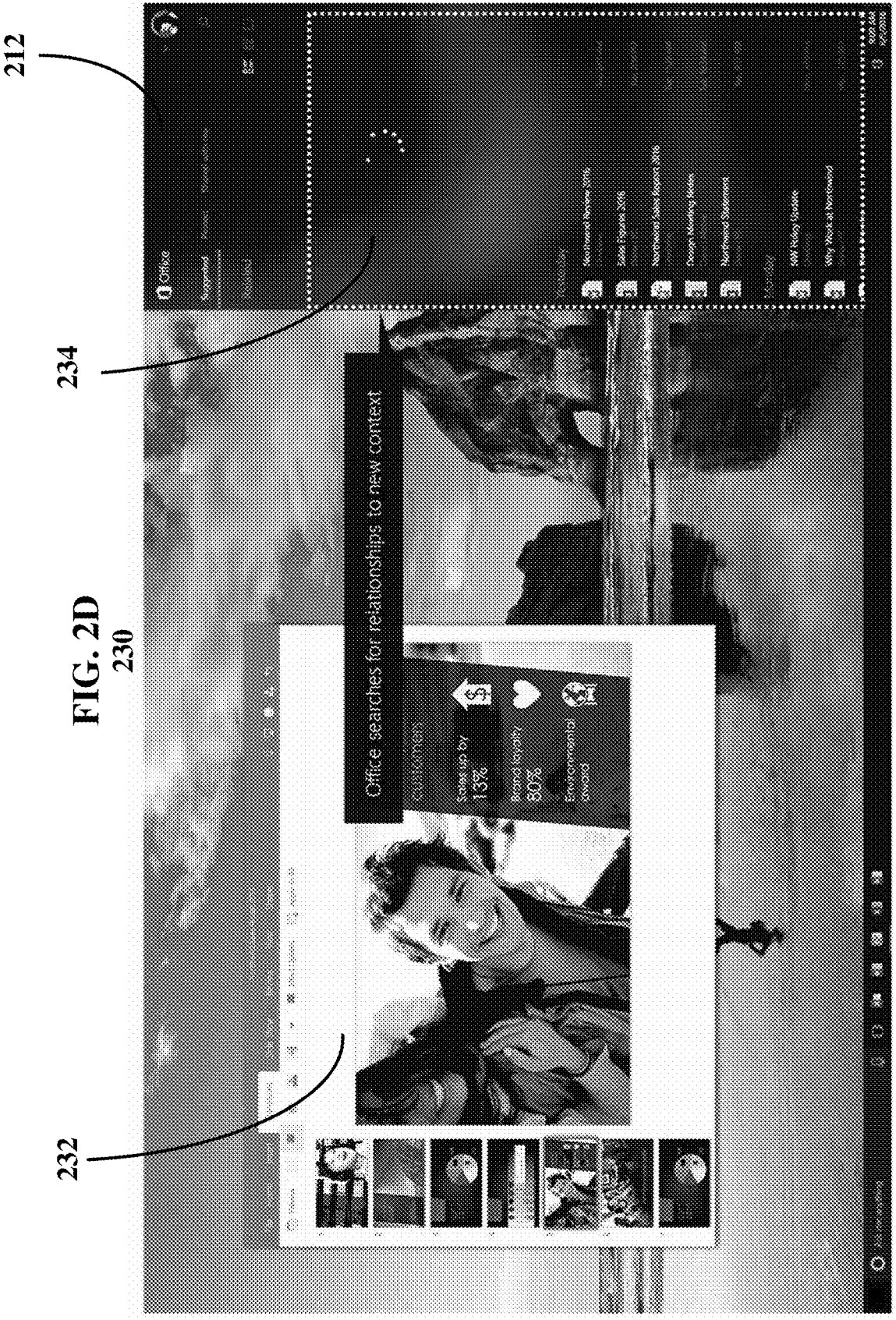
Figure 2G:
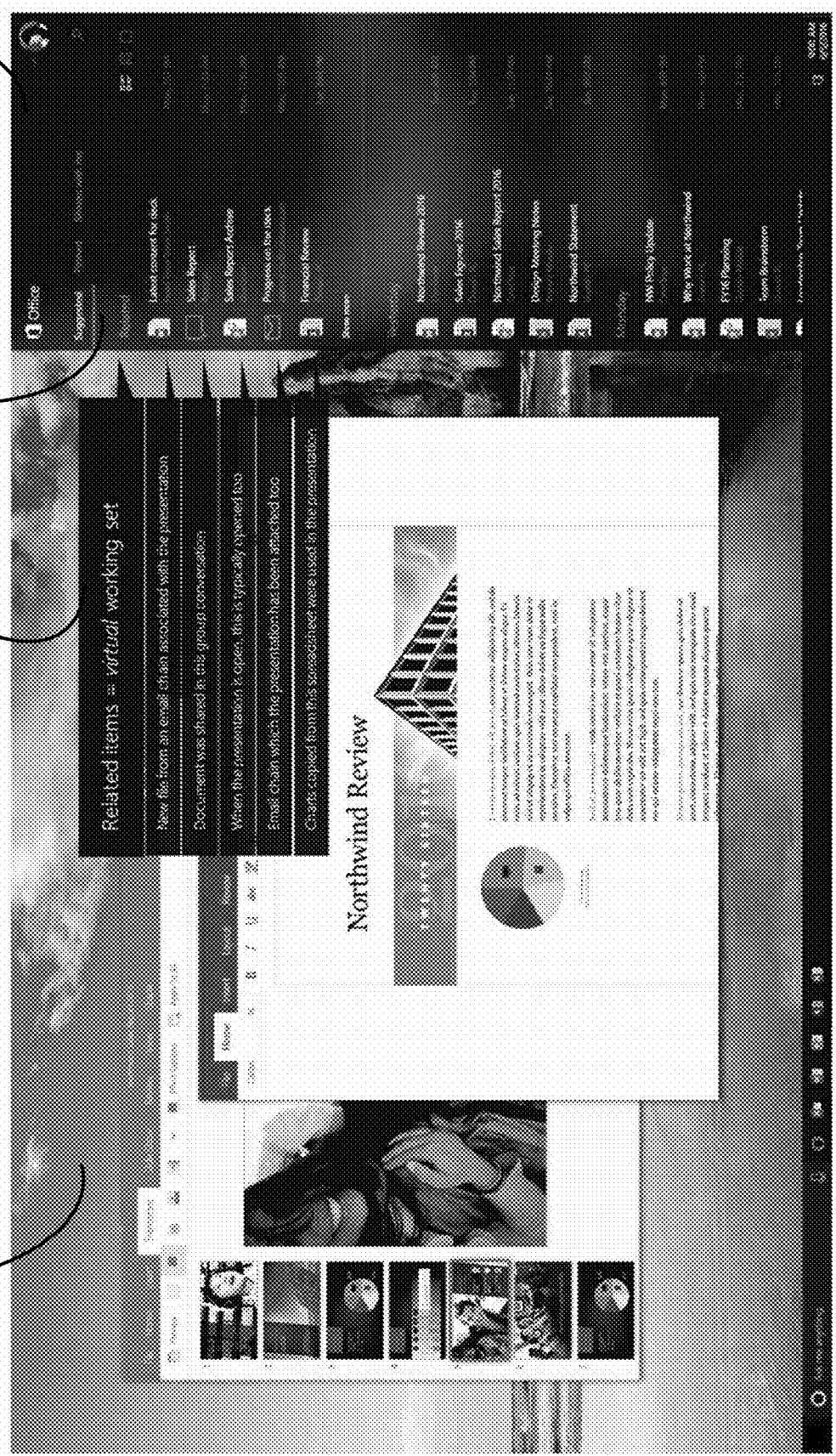

User interface view 220 (of FIG. 2C) provides a view of an OS of a computing device that comprises an updated view of the recall service menu 212 (described with respect to user interface view 210 of FIG. 2B). As can be seen in user interface view 220, a user, through the computing device, selects a user interface feature 222 of the recall service menu 212. As an example, user interface feature 222 corresponds to selection of a file (e.g. slide-based content) of a visual-based presentation program. Selection of user interface feature 222 triggers update to a display of the computing device as shown in user interface view 230 (FIG. 2D).

User interface view 230 (of FIG. 2D) provides a view of an OS of a computing device that comprises a partial view of a productivity application 232 and a view of the recall service menu 212. The productivity application 232 is a visual-based presentation program that is launched based on the selection of user interface feature 222 (of FIG. 2C). As shown in user interface view 230, the recall service menu 212 is in the process of updating, for example, based on the detected operation context of the user where an electronic document of the productivity application 232 (visual-based presentation program) is accessed. User interface view 230 illustrates that the recall service menu 212 is in the process of updating a listing of digital artifacts that are most relevant to the electronic document, which is being accessed through the visual-based presentation program. As an example, the operational context (e.g. access to the visual-based presentation file) is being evaluated by an exemplary contextual object model as described in method 100 (FIG. 1).

User interface view 240 (of FIG. 2E) provides a view of an OS of a computing device that comprises a partial view of a productivity application 232 and a view of an updated recall service menu 212. The updated recall service menu 212 provides an exemplary listing of digital artifacts 242 that are relevant to the visual-based presentation program being accessed through productivity application 232. As described in the foregoing, the plurality of artifacts may be generated and surfaced based on processing by an exemplary contextual object model (described in FIG. 1). As can be seen in user interface view 240, the listing of digital artifacts 242 provides access to "related items" that are contextually relevant to the accessed electronic document of the visual-based presentation program. This may be presented for the user as a user interface notification 244 associated with the recall service. An exemplary listing of most relevant digital artifacts 242 is differentiated from other listings such as recently accessed electronic documents as the latter does not account for contextual relationships between electronic documents. An exemplary listing of recently accessed documents may also be maintained for a user as indicated through user interface notification 246.

User interface view 250 (of FIG. 2F) provides a view of an OS of a computing device that comprises a partial view of a productivity application 232 and a view of the recall service menu 212. As can be seen in user interface view 250, a user, through the computing device, selects a user interface feature 252 of the recall service menu 212. User interface feature 252 corresponds with an exemplary electronic document of a word processing application. Selection of user interface feature 252 triggers update to a display of the computing device as shown in user interface view 260 (FIG. 2G), where the recall service menu 212 is updated to provide a listing of digital artifacts that are contextually relevant to the accessed word processing document.

User interface view 260 (of FIG. 2G) provides a view of an OS of a computing device that comprises a partial view of a productivity application 262 and a view of the recall service menu 212. As can be seen in user interface view 260, the productivity application 262 has updated to a word processing application that displays an electronic document corresponding with the user selection (described in user interface view 250). Furthermore, the recall service menu 212 displays an updated listing of digital artifacts 264 that corresponds with access to the electronic word processing document being accessed through the productivity application 262. Moreover, the user interface associated with the recall service menu 212 displayed an updated user interface notification 266 that provides context for the user as to why individual items were included in the listing of digital artifacts 264. Callout notifications of this nature may enhance user interaction with an exemplary recall service and associated productivity applications.

Figure 3B:
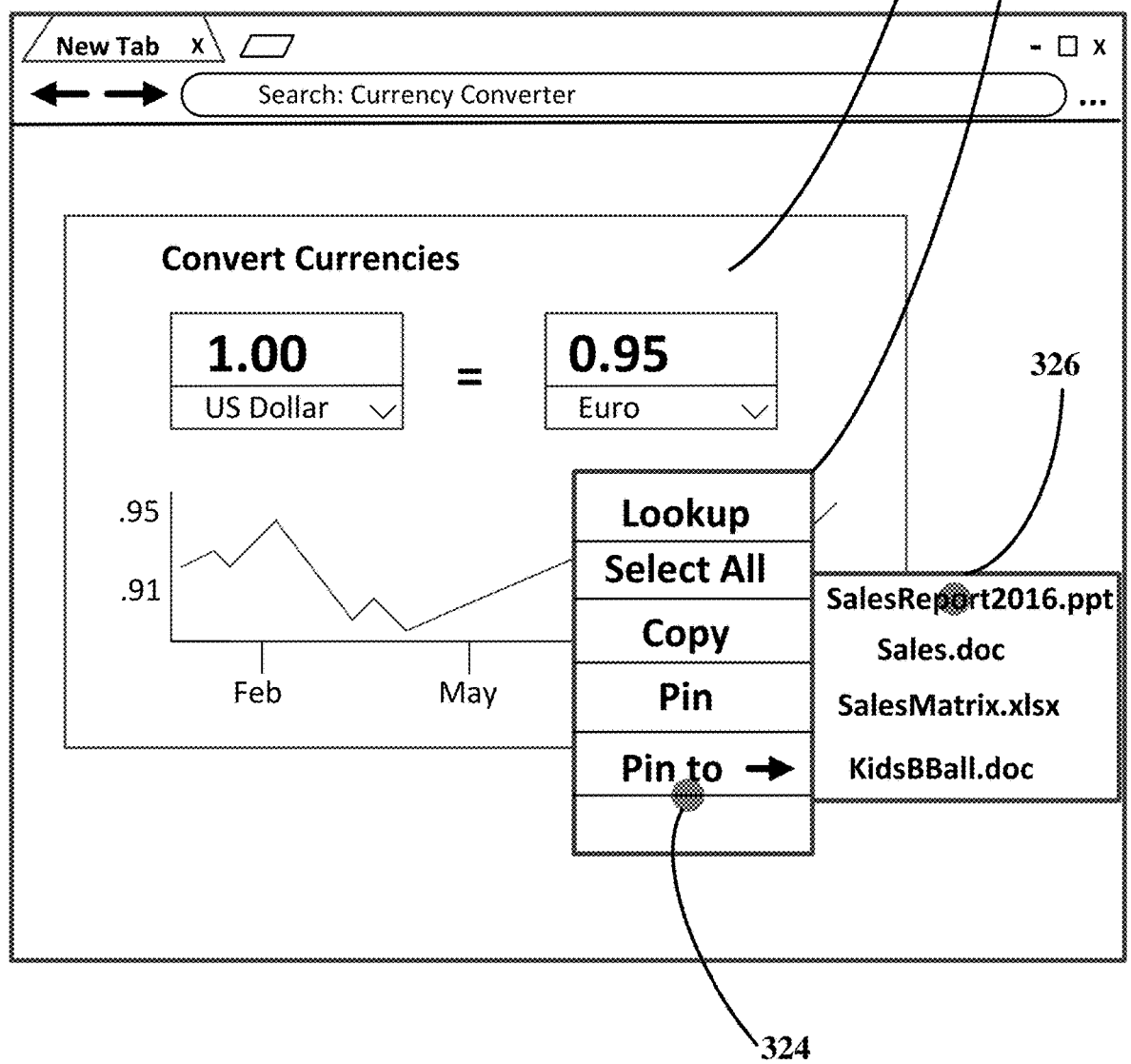
Figure 3C:
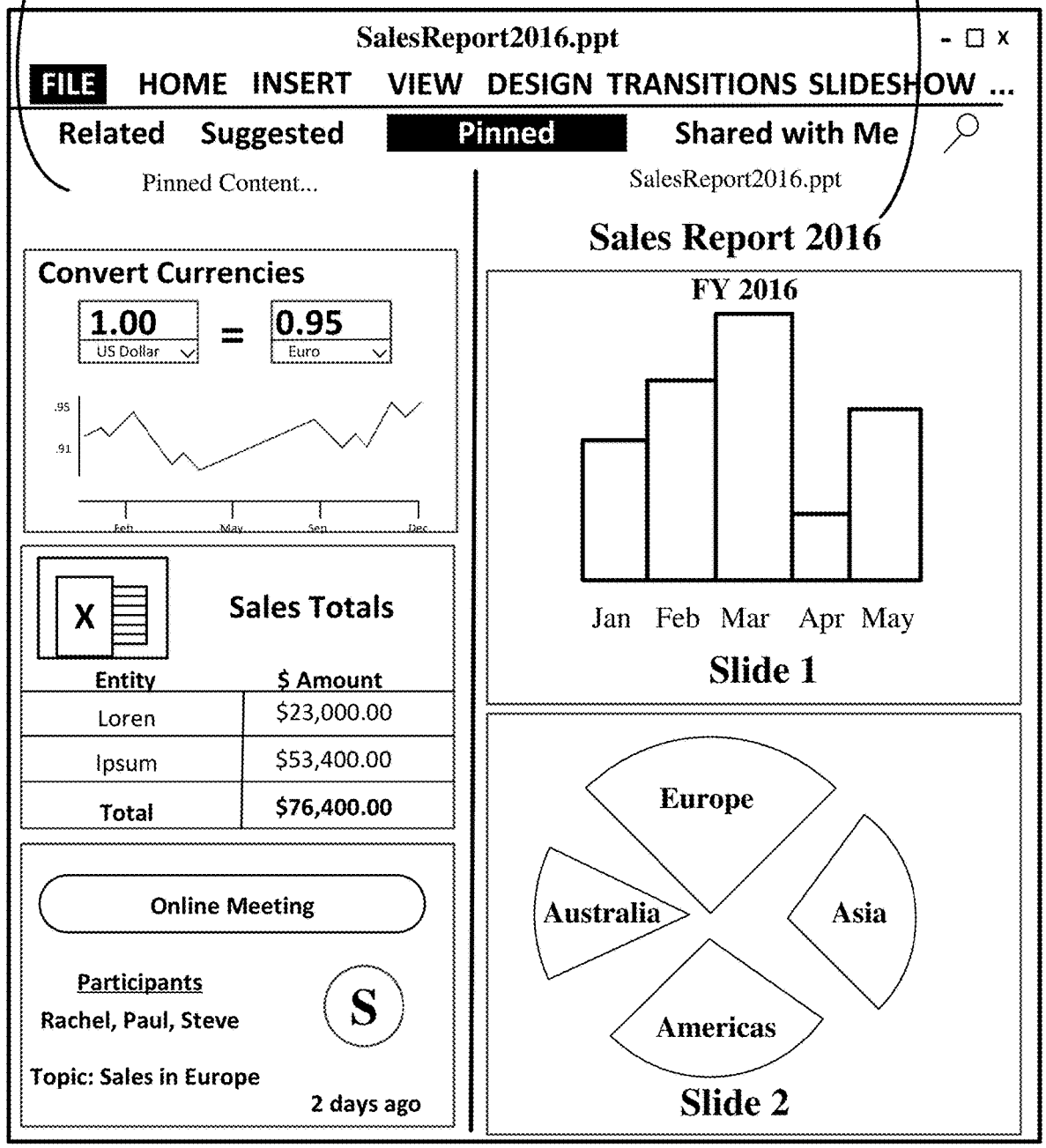

FIGS. 3A-3C provide user interface views 300-340 illustrating an example of linking digital content to an exemplary electronic document with which aspects of the present disclosure may be practiced.

User interface view 300 (of FIG. 3A) provides a view of an OS of a computing device that illustrates access a web browsing application. As an example, a user may execute a search for a "currency converter" using a user interface search feature 302 of the web browsing application. An exemplary currency conversion service 304 may be displayed within the web browsing application based on the search entered through the user interface search feature 302. Consider an example where a user is working on a slide-based visual presentation and is accessing the web browser application to obtain currency conversion information to add to the slide-based visual presentation. Typically, each time a user desires to perform a currency conversion, a user would have to exit the visual presentation program and launch (and access) the currency conversion service. To provide digital content from the currency conversion service within an exemplary visual presentation program, the user would be required to make a manual association between the two application/services, for example, through copy and paste operations, among other examples.

User interface view 320 (of FIG. 3B) provides a view of an OS of a computing device that illustrates an updated view of the web browsing application (illustrated in FIG. 3A and described in the foregoing). User interface view 320 shows a result of a received user input (e.g. mouse right-click, touch/hold input, voice command, etc.) that triggers display of user interface feature 322, which enables the user to select actions pertaining to the digital content of the exemplary currency conversion service. As shown in user interface view 320, a user may make a user interface selection 324 ("Pin to") to pin the currency conversion service to an exemplary electronic document (e.g. of a productivity application). An exemplary recall service may be configured to provide functionality to enable users to associate content of applications/services to specific electronic documents (e.g. of productivity applications). For instance, digital content may be pinned to the electronic document, which creates a link between the digital content and the electronic document. When the electronic document is subsequently accessed, the pinned digital content may be identified for a user. In one instance, a created link (e.g. from pinned content) may also be associated with previous context in which the digital content was being utilized. Following user interface selection 324, a user may make a subsequent user interface selections 326, selecting a specific electronic document to pin digital content (of the currency conversion service) to the electronic document. In the example illustrated in user interface view 320, the user selects to pin digital content of the currency conversion service to a slide-based visual presentation of an exemplary visual-based presentation program.

User interface view 340 (of FIG. 3C) provides a view of an OS of a computing device that is executing an exemplary productivity application. In the example shown in user interface view 340, the productivity application being accessed is a visual-based presentation program, where an electronic document 344 (of the visual-based presentation program) is being displayed (on the right side of the display). The electronic document 344 being accessed is a result of user interface selection 326 (illustrated in user interface view 320 of FIG. 3B). An exemplary home service described herein may be configured to interface with productivity application such as the visual-based presentation program to enable pinned content to be accessed through the productivity application. As illustrated in user interface view 340, pinned content 342, for the electronic document 344, is displayed (on the left side of the display). The pinned content 342 comprises a link to the currency conversion service that is provided directly within the productivity application. In such an example, functionality associated with the currency conversion service is incorporated directly into the productivity application, for example, where functionality of the visual-based presentation service is thus extended.

When the electronic document is subsequently accessed, the pinned digital content 342 may be identified for a user. In one instance, a created link (e.g. from pinned content) may also be associated with previous context in which the digital content was being utilized. In one example, a placement/position of the pinned digital content may be saved so that context can be provided for the user who is accessing the electronic document. As can be seen in user interface view 340 (as compared with user interface views 300 and 320), context associated with a conversion from U.S. dollars to Euros is saved for the user. In a further example, executed actions that correspond with pinned digital content may be recalled for a user. For instance, a user may access a visual slide-based presentation where pinned digital content (e.g. from other types of applications/services) may be associated for the user when the visual slide-based presentation is accessed. A user may have control over pinning/unpinning content as well as associating specific content with certain productivity applications. In alternative examples where content is not explicitly pinned by the user, processing by an exemplary contextual object model may result in contextual suggestions of digital artifacts that may be of relevance to a user.

Figure 5A:
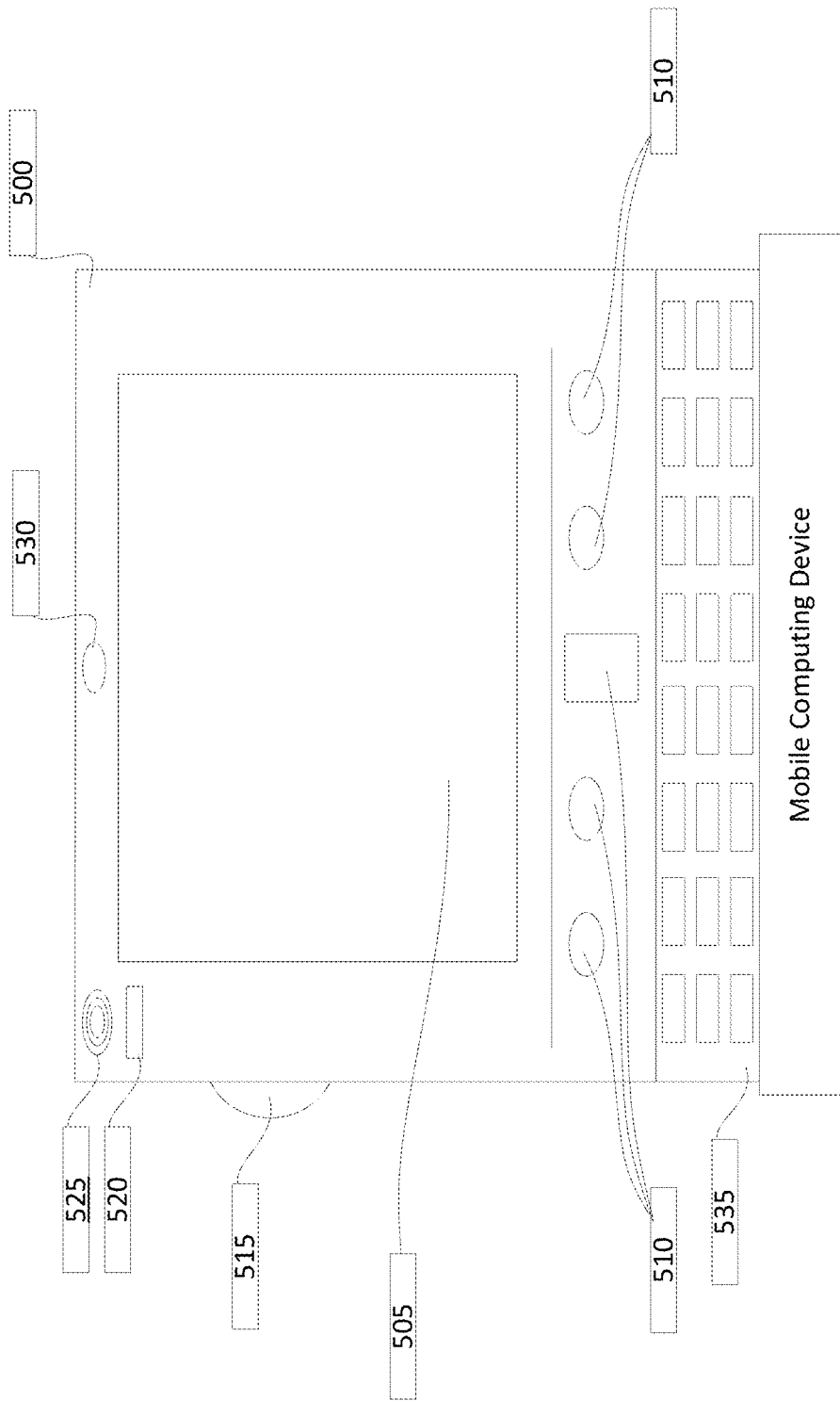
FIGS. 5A and 5B are simplified block diagrams of a mobile computing device with which aspects of the present disclosure may be practiced.
Figure 5B:
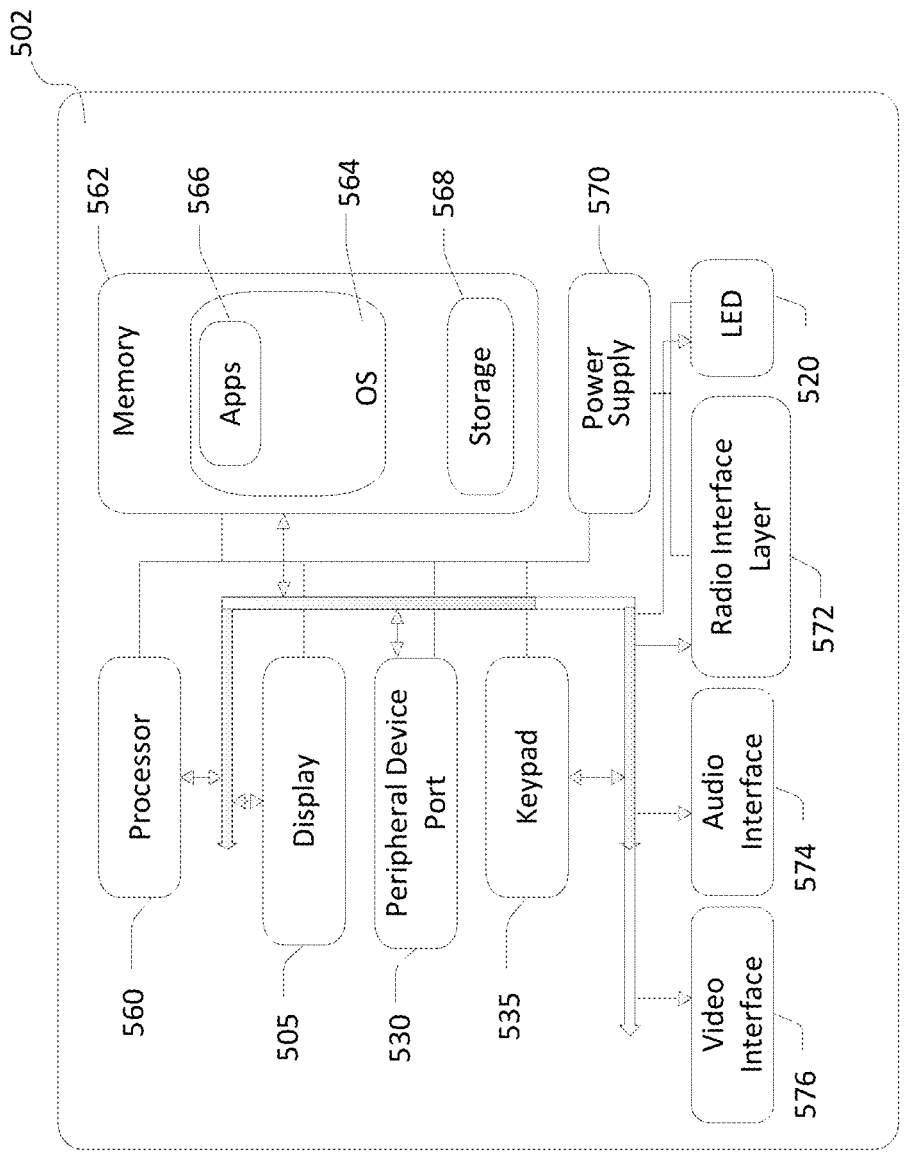
Figure 6:
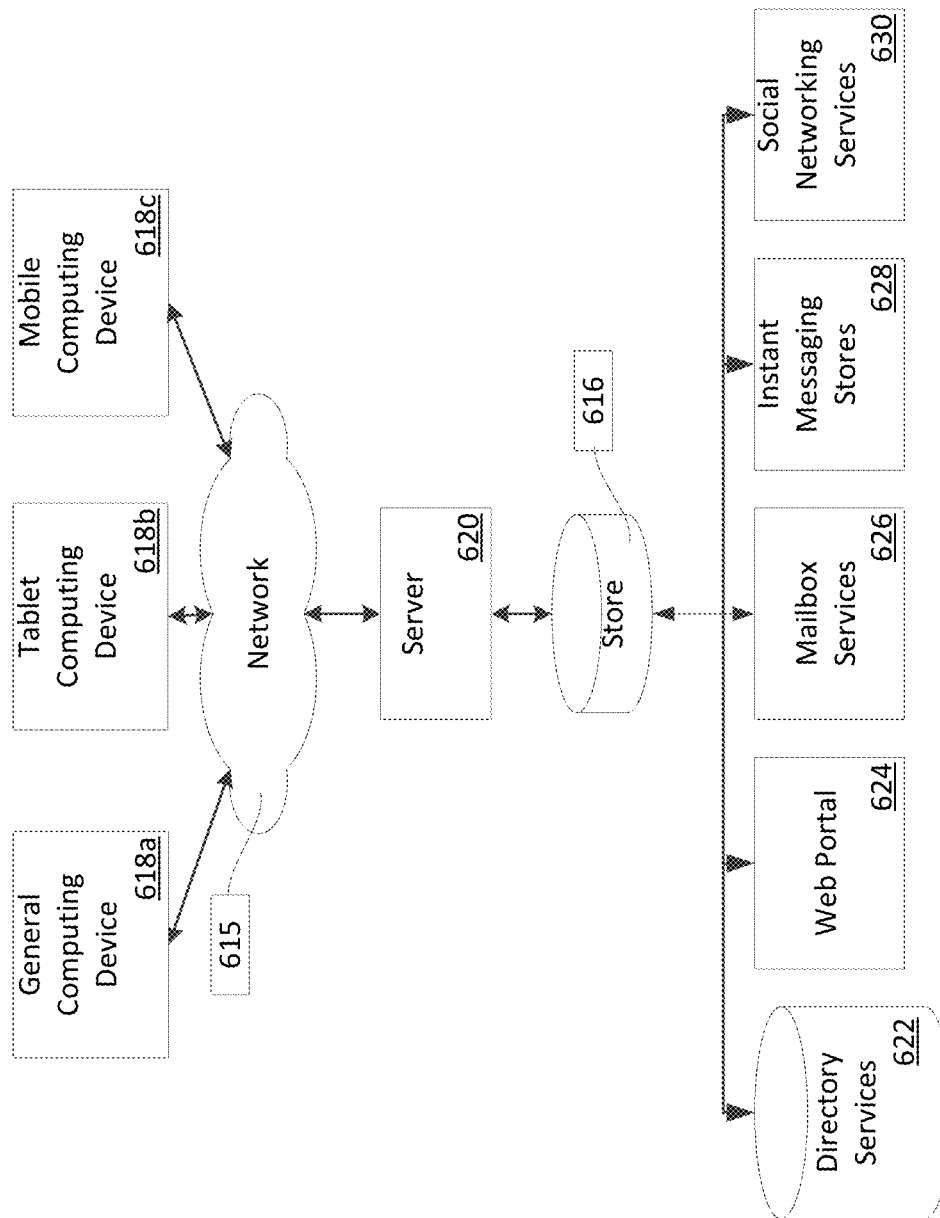
FIG. 6 is a simplified block diagram of a distributed computing system in which aspects of the present disclosure may be practiced.

FIGS. 4-6 and the associated descriptions provide a discussion of a variety of operating environments in which examples of the invention may be practiced. However, the devices and systems illustrated and discussed with respect to FIGS. 4-6 are for purposes of example and illustration and are not limiting of a vast number of computing device configurations that may be utilized for practicing examples of the invention, described herein.

FIG. 4 is a block diagram illustrating physical components of a computing device 402, for example a mobile processing device, with which examples of the present disclosure may be practiced. Among other examples, computing device 402 may be an exemplary computing device configured for execution of an exemplary recall service as described herein. In a basic configuration, the computing device 402 may include at least one processing unit 404 and a system memory 406. Depending on the configuration and type of computing device, the system memory 406 may comprise, but is not limited to, volatile storage (e.g., random access memory), non-volatile storage (e.g., read-only memory), flash memory, or any combination of such memories. The system memory 406 may include an operating system 407 and one or more program modules 408 suitable for running software programs/modules 420 such as IO manager 424, other utility 426 and application 428. As examples, system memory 406 may store instructions for execution. Other examples of system memory 406 may store data associated with applications. The operating system 407, for example, may be suitable for controlling the operation of the computing device 402. Furthermore, examples of the invention may be practiced in conjunction with a graphics library, other operating systems, or any other application program and is not limited to any particular application or system. This basic configuration is illustrated in FIG. 4 by those components within a dashed line 422. The computing device 402 may have additional features or functionality. For example, the computing device 402 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 406. While executing on the processing unit 404, program modules 408 (e.g., Input/Output (I/O) manager 424, other utility 426 and application 428) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 402 may also have one or more input device(s) 412 such as a keyboard, a mouse, a pen, a sound input device, a device for voice input/recognition, a touch input device, etc. The output device(s) 414 such as a display, speakers, a printer, etc. may also be included. The aforementioned devices are examples and others may be used. The computing device 404 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 406, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 402. Any such computer storage media may be part of the computing device 402. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a personal data assistant, a tablet personal computer, a phablet, a slate, a laptop computer, and the like, with which examples of the invention may be practiced. Mobile computing device 500 may be an exemplary computing device configured for execution of an exemplary recall service as described herein. Application command control may be provided for applications executing on a computing device such as mobile computing device 500. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 5A, one example of a mobile computing device 500 for implementing the examples is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., touch screen display). If included, an optional side input element 515 allows further user input. The side input element 515 may be a rotary switch, a button, or any other type of manual input element. In alternative examples, mobile computing device 500 may incorporate more or less input elements. For example, the display 505 may not be a touch screen in some examples. In yet another alternative example, the mobile computing device 500 is a portable phone system, such as a cellular phone. The mobile computing device 500 may also include an optional keypad 535. Optional keypad 535 may be a physical keypad or a "soft" keypad generated on the touch screen display or any other soft input panel (SIP). In various examples, the output elements include the display 505 for showing a GUI, a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 can incorporate a system (i.e., an architecture) 502 to implement some examples. In one examples, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA), tablet and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device (e.g. system 502) described herein.

The system 502 has a power supply 570, which may be implemented as one or more batteries. The power supply 570 might further include an external power source, such as an AC adapter or a powered docking cradle that supplements or recharges the batteries.

The system 502 may include peripheral device port 530 that performs the function of facilitating connectivity between system 502 and one or more peripheral devices. Transmissions to and from the peripheral device port 530 are conducted under control of the operating system (OS) 564. In other words, communications received by the peripheral device port 530 may be disseminated to the application programs 566 via the operating system 564, and vice versa.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525 (as described in the description of mobile computing device 500). In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525 (shown in FIG. 5A), the audio interface 574 may also be coupled to a microphone to receive audible input, such as to facilitate a telephone conversation. In accordance with examples of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one example of the architecture of a system for providing an application that reliably accesses target data on a storage system and handles communication failures to one or more client devices, as described above. The system of FIG. 6 may be an exemplary system configured for execution of an exemplary recall service as described herein. Target data accessed, interacted with, or edited in association with programming modules 408 and/or applications 420 and storage/memory (described in FIG. 4) may be stored in different communication channels or other storage types. For example, various documents may be stored using a directory service 622, a web portal 624, a mailbox service 626, an instant messaging store 628, or a social networking site 630, application 428, IO manager 424, other utility 426, and storage systems may use any of these types of systems or the like for enabling data utilization, as described herein. A server 620 may provide storage system for use by a client operating on general computing device 402 and mobile device(s) 500 through network 615. By way of example, network 615 may comprise the Internet or any other type of local or wide area network, and a client node may be implemented for connecting to network 615. Examples of a client node comprise but are not limited to: a computing device 402 embodied in a personal computer, a tablet computing device, and/or by a mobile computing device 500 (e.g., mobile processing device). As an example, a client node may connect to the network 615 using a wireless network connection (e.g. WiFi connection, Bluetooth, etc.). However, examples described herein may also extend to connecting to network 615 via a hardwire connection. Any of these examples of the client computing device 402 or 500 may obtain content from the store 616.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   identifying an operational context associated with a user, wherein the identifying of the operational context comprises:
   detecting, through a productivity service, user access to an electronic document;
   identifying a content interaction that modifies content within the electronic document during at least one previous instance of the user access to the electronic document based on an identification of the electronic document;
   identifying one or more other productivity services that concurrently accessed digital content through the one or more other productivity services during the at least one previous instance of the user access to the electronic document;
   identifying digital artifacts that are each configured to recall, for a digital document that is associated with the one or more other productivity services, a displayed user state that is a state of display of the digital document showing user action with the digital content of the digital document during the content interaction within the electronic document;
   generating, using trained machine learning modeling configured to determine a relevance between the displayed user state of each of the digital artifacts and the content interaction within the electronic document, confidence scoring that ranks relevance between metadata associated with the displayed user state of each of the digital artifacts and metadata identifying user actions that modify the content of the electronic document during the at least one previous instance of user access to the electronic document; and
   surfacing a representation of one or more of the digital artifacts in a user interface based on a threshold evaluation of the confidence scoring.

2. The method of claim 1, wherein the identifying of the operational context further comprises: detecting one or more applications or services that are actively being accessed during the detected user access to the electronic document, and wherein the identifying of the one or more other productivity services during the at least one previous instance of the user access comprises matching the one or more applications or services that are actively being accessed with the one or more other productivity services accessed during the at least one previous instance of the user access to the electronic document.

3. The method of claim 1, further comprising: receiving, through the user interface, a selection of a digital artifact; and surfacing, based on the received selection of the digital artifact, a contextual representation of the digital artifact that corresponds with the displayed user state, wherein the contextual representation automatically recreates a window size and a layout position of the digital document relative to the electronic document during the at least one previous instance of user access to the electronic document.

4. The method of claim 1, further comprising: receiving a selection of a digital artifact from the representation of the one or more digital artifacts; and in response to receiving the selection of the digital artifact, launching a productivity service, of the one or more other productivity services, that displays the displayed user state of a corresponding digital document.

5. The method of claim 1, further comprising: creating, for the at least one previous instance of user access to the electronic document, a ranked grouping of a plurality of digital artifacts that presents an ordered listing of the plurality of digital artifacts ordered based on an evaluation of the confidence scoring, and wherein the representation of the one or more of the digital artifacts is the ranked grouping of the plurality of digital artifacts.

6. The method of claim 1, wherein the one or more digital artifacts, included in the representation of one or more of the digital artifacts, have a confidence scoring that exceeds a threshold confidence score set as the threshold evaluation.

7. The method of claim 1, wherein the threshold evaluation selects, for inclusion in the representation of one or more of the digital artifacts, a predetermined number of the one or more digital artifacts that have a highest confidence score determined from evaluating the confidence scoring.

8. A system comprising:
at least one processor; and
a memory operatively connected with the at least one processor storing computer-executable instructions that, when executed by the at least one processor, causes the at least one processor to execute a method that comprises:
identifying an operational context associated with a user, wherein the identifying of the operational context comprises:
detecting, through a productivity service, user access to an electronic document;
identifying a content interaction that modifies content within the electronic document during at least one previous instance of the user access to the electronic document based on an identification of the electronic document;
identifying one or more other productivity services that concurrently accessed digital content through the one or more other productivity services during the at least one previous instance of the user access to the electronic document;
identifying digital artifacts that are each configured to recall, for a digital document that is associated with the one or more other productivity services, a displayed user state that is a state of display of the digital document showing user action with the digital content of the digital document during the content interaction within the electronic document;
generating, using trained machine learning modeling configured to determine a relevance between the displayed user state of each of the digital artifacts and the content interaction within the electronic document, confidence scoring that ranks relevance between metadata associated with the displayed user state of each of the digital artifacts and metadata identifying user actions that modify the content of the electronic document during the at least one previous instance of user access to the electronic document; and surfacing a representation of one or more of the digital artifacts in a user interface based on a threshold evaluation of the confidence scoring.

9. The system of claim 8, wherein the identifying of the operational context further comprises: detecting one or more applications or services that are actively being accessed during the detected user access to the electronic document, and wherein the identifying of the one or more other productivity services during the at least one previous instance of the user access comprises matching the one or more applications services that are actively being accessed with the one or more other productivity services accessed during the at least one previous instance of the user access to the electronic document.

10. The system of claim 8, wherein the method, executed by the at least one processor further comprises: receiving, through the user interface, a selection of a digital artifact; and surfacing, based on the received selection of the digital artifact, a contextual representation of the digital artifact that corresponds with the displayed user state, wherein the contextual representation automatically recreates a window size and a layout position of the digital document relative to the electronic document during the at least one previous instance of user access to the electronic document.

11. The system of claim 8, wherein the method, executed by the at least one processor, further comprises: receiving a selection of a digital artifact from the representation of the one or more digital artifacts; and in response to receiving the selection of the digital artifact, launching a productivity service, of the one or more other productivity services, that displays the displayed user state of a corresponding digital document.

12. The system of claim 8, wherein the method, executed by the at least one processor, further comprises: creating, for the at least one previous instance of user access to the electronic document, a ranked grouping of a plurality of digital artifacts that presents an ordered listing of the plurality of digital artifacts ordered based on the result of the confidence scoring, and wherein the representation of the one or more of the digital artifacts is the ranked grouping of the plurality of digital artifacts.

13. The system of claim 8, wherein the one or more digital artifacts, included in the representation of one or more of the digital artifacts, have a confidence scoring that exceeds a threshold confidence score set as the threshold evaluation.

14. The system of claim 8, wherein the threshold evaluation selects, for inclusion in the representation of one or more of the digital artifacts, a predetermined number of the one or more digital artifacts that have a highest confidence score determined from evaluating the confidence scoring.

15. A computer storage device storing computer-executable instructions that, when executed by at least one processor, causes the at least one processor to execute a method comprising:
identifying an operational context associated with a user, wherein the identifying of the operational context comprises: detecting, through a productivity service, user access to an electronic document;

identifying a content interaction that modifies content within the electronic document during at least one previous instance of the user access to the electronic document based on an identification of the electronic document;

identifying one or more other productivity services that concurrently accessed digital content through the one or more other productivity services during the at least one previous instance of the user access to the electronic document;

identifying digital artifacts that are each configured to recall, for a digital document that is associated with the one or more other productivity services, a displayed user state that is a state of display of the digital document showing user action with the digital content of the digital document during the content interaction within the electronic document;

generating, using trained machine learning modeling configured to determine a relevance between the displayed user state of each of the digital artifacts and the content interaction within the electronic document, confidence scoring that ranks relevance between metadata associated with the displayed user state of each of the digital artifacts and metadata identifying user actions that modify the content of the electronic document during the at least one previous instance of user access to the electronic document;

and surfacing a representation of one or more of the digital artifacts in a user interface based on a threshold evaluation of the confidence scoring.

16. The computer storage device of claim 15, wherein the executed method further comprising: receiving, through the user interface, a selection of a digital artifact; and surfacing, based on the received selection of the digital artifact, a contextual representation of the digital artifact that corresponds with the displayed user state, wherein the contextual representation automatically recreates a window size and a layout position of the digital document relative to the electronic document during the at least one previous instance of user access to the electronic document.

17. The computer storage device of claim 15, wherein the method, executed by the at least one processor, further comprising: receiving a selection of a digital artifact from the representation of the one or more digital artifacts; and in response to receiving the selection of the digital artifact, launching a productivity service, of the one or more other productivity services, that displays the displayed user state of a corresponding digital document.

18. The computer storage device of claim 15, wherein the method, executed by the at least one processor, further comprising: creating, for the at least one previous instance of user access to the electronic document, a ranked grouping of a plurality of digital artifacts that presents an ordered listing of the plurality of digital artifacts ordered based on the result of the confidence scoring, and wherein the representation of the one or more of the digital artifacts is the ranked grouping of the plurality of digital artifacts.

19. The computer storage device of claim 15, wherein the one or more digital artifacts, included in the representation of one or more of the digital artifacts, have a confidence scoring that exceeds a threshold confidence score set as the threshold evaluation.

20. The computer storage device of claim 15, wherein the threshold evaluation selects, for inclusion in the representation of one or more of the digital artifacts, a predetermined number of the one or more digital artifacts that have a highest confidence score determined from evaluating the confidence scoring.

* * * * *